(12) United States Patent
Walser (10) Patent No.: US 11,910,800 B2
(45) Date of Patent: Feb. 27, 2024

(54) APPARATUS FOR PREPARING AND COOKING COATED FOOD ARTICLES IMPALED UPON A STICK

(71) Applicant: AUTOMATED FOOD SYSTEMS, INC., Waxahachie, TX (US)

(72) Inventor: Robert Walser, Waxahachie, TX (US)

(73) Assignee: AUTOMATED FOOD SYSTEMS, INC., Waxahachie, TX (US)

( * ) Notice: Subject to any disclaimer, the term of this patent is extended or adjusted under 35 U.S.C. 154(b) by 1331 days.

(21) Appl. No.: 16/405,704

(22) Filed: May 7, 2019

(65) Prior Publication Data

US 2019/0335770 A1    Nov. 7, 2019

Related U.S. Application Data

(60) Provisional application No. 62/667,724, filed on May 7, 2018.

(51) Int. Cl.
| | |
|---|---|
| A23G 9/26 | (2006.01) |
| A22C 17/00 | (2006.01) |
| A47J 37/12 | (2006.01) |
| A23P 20/17 | (2016.01) |
| A23P 10/10 | (2016.01) |

(52) U.S. Cl.
CPC ............ *A22C 17/006* (2013.01); *A23P 10/10* (2016.08); *A23P 20/17* (2016.08); *A47J 37/1214* (2013.01)

(58) Field of Classification Search
CPC ....... A47J 37/1214; A23P 20/17; A23P 10/10; A22C 17/006

USPC ............................................... 99/403; 29/809
See application file for complete search history.

(56) References Cited

U.S. PATENT DOCUMENTS

| | | | | |
|---|---|---|---|---|
| 1,706,491 | A | | 3/1929 | Jenkins |
| 2,552,621 | A | * | 5/1951 | Clay .................. A47J 37/1214 |
| | | | | 15/93.1 |
| 2,585,364 | A | * | 2/1952 | Wright .................... A23L 13/62 |
| | | | | 118/232 |
| 2,733,439 | A | | 2/1956 | Pikal |
| 3,221,673 | A | | 12/1965 | Shelly |
| 3,242,249 | A | | 3/1966 | Nouel |
| 3,271,813 | A | * | 9/1966 | Gernandt ............. A22C 17/006 |
| | | | | 425/576 |

(Continued)

OTHER PUBLICATIONS

Elesa and Ganter Catalogue, "GN 615 Spring Plungers," p. 839, Aug. 2018.

*Primary Examiner* — Jimmy Chou (57) ABSTRACT

An apparatus is disclosed for preparing a food article (300) such as a corn dog. The apparatus includes a frame (10) mounting a loading station (50), a dipping station (162), a frying station (190) and an unloading station (220). The loading station (50) inserts one end (306) of a stick (302) into the food article (300) and the other end (304) into an aperture (40) in a stick bar (38). The stick (302) and food article (300) are held in the aperture (40) by a spring loaded plunger (310) extending into the aperture (40). The spring loaded plunger (310) holds the stick (302) and food article (300) on the stick bar (38) while the food article (300) is dipped in batter at the dipping station (162) and fried at the frying station (190). The cooked food article (300) and stick (302) are removed from the stick bar (38) at the unloading station (220) for shipment to the customer.

9 Claims, 8 Drawing Sheets

(56) References Cited

U.S. PATENT DOCUMENTS

| | | | | |
|---|---|---|---|---|
| 3,316,010 | A * | 4/1967 | Lowrance | A23P 10/10 |
| | | | | 118/31 |
| 4,080,716 | A | 3/1978 | Vom Dorp | |
| 4,130,936 | A * | 12/1978 | Cottrell | A23G 9/265 |
| | | | | 425/126.2 |
| 4,379,795 | A * | 4/1983 | Walser | A23G 3/24 |
| | | | | 99/403 |
| 4,430,930 | A * | 2/1984 | Walser | A23P 10/10 |
| | | | | 99/441 |
| 4,592,709 | A * | 6/1986 | Gram | A23G 9/265 |
| | | | | 425/126.2 |
| 4,842,181 | A | 6/1989 | Walser | |
| 5,281,798 | A * | 1/1994 | Hamm | G01N 21/8422 |
| | | | | 250/226 |
| 6,280,786 | B1 | 8/2001 | Williams et al. | |
| 6,666,320 | B1 | 12/2003 | Fessler | |
| 9,907,317 | B2 * | 3/2018 | Baumeister | A23G 3/0268 |
| 10,531,677 | B2 * | 1/2020 | Bendixen | A23G 9/503 |
| 2004/0065212 | A1 | 4/2004 | Walser | |
| 2009/0007933 | A1 * | 1/2009 | Thomas | B23K 26/36 |
| | | | | 219/121.81 |
| 2009/0181155 | A1 * | 7/2009 | Walser | A22C 17/006 |
| | | | | 99/485 |
| 2010/0162902 | A1 | 7/2010 | Paya | |
| 2013/0206717 | A1 * | 8/2013 | Lane | A47J 31/0636 |
| | | | | 220/521 |
| 2015/0282495 | A1 | 10/2015 | Völkl | |
| 2019/0335770 | A1 * | 11/2019 | Walser | A22C 17/006 |

* cited by examiner

APPARATUS FOR PREPARING AND COOKING COATED FOOD ARTICLES IMPALED UPON A STICK

CROSS-REFERENCE TO RELATED APPLICATIONS

This application claims the benefit of U.S. Provisional Application No. 62/667,724, filed on May 7, 2018, entitled APPARATUS FOR PREPARING AND COOKING COATED FOOD ARTICLES IMPALED UPON A STICK, which is incorporated by reference in its entirety.

TECHNICAL FIELD

This invention relates to the preparation and cooking of a coated food article on a stick, and in particular, to a corn dog.

BACKGROUND

The corn dog is a popular food item throughout the world. It consists of a sausage or wiener coated with a batter and then deep-fried to produce a tasty crisp coating. The corn dog is typically impaled on a stick to make it easy to eat the corn dog at a state fair or other outdoor event.

Over the years, a number of inventions have been made to increase the quality, ease and efficiency of making a corn dog. The inventions disclosed in U.S. Pat. No. 4,379,795 issued Apr. 12, 1983, to Glenn E. Walser and U.S. Pat. No. 4,842,181 issued Jun. 27, 1989, to Glenn E. Walser, both patents being hereby incorporated by reference herein in their entirety, are examples of these inventions.

While these corn dog devices work well, a need exists to increase efficiency and output for the production of corn dogs, as well as seeking the product with the best flavor possible.

SUMMARY

In accordance with one aspect of the present invention, an apparatus is provided for preparing and cooking coated food articles impaled upon a stick, such as a corn dog. The apparatus includes a frame, a stick bar having at least one aperture for receiving a first end of a stick, a loading station mounted on the frame for inserting a second end of the stick in the food article and the first end of the stick in the aperture of the stick bar, a dipping station mounted on the frame for dipping the food article into a batter to coat the food article, a frying station mounted on the frame for frying the coated food article, an unloading station mounted on the frame for removing the cooked food article from the apparatus, and a transport mechanism mounted on the frame to transport the stick bar sequentially from the loading station to the dipping station to the frying station and to the unloading station, the stick bar having a spring loaded plunger extending into the aperture to engage the first end of the stick to secure the stick, and the food article thereon, during coating and frying of the food article and permitting removal of the cooked food article from the stick bar at the unloading station.

In accordance with another aspect of the present invention, the spring loaded plunger holds the stick in place with about 3.5 to 4 pounds of force.

In accordance with another aspect of the present invention, the spring loaded plunger holds the stick in place with about 3.5 to 7 pounds of force.

In accordance with another aspect of the present invention, the stick bar has 16, 20 or 26 apertures along its length.

In accordance with another aspect of the present invention, the spring loaded plunger is adjustable to vary the force on the stick.

In accordance with another aspect of the present invention, the stick is about 5 ½ inches long, ¼ inch wide and 0.094 (³⁄₃₂) inches thick.

In accordance with another aspect of the present invention, the spring loaded plunger is secured to the stick bar with a jam nut using nylon.

In accordance with another aspect of the present invention, a stick bar is provided for a cooking apparatus. The stick bar has an elongated stainless steel body having first and second ends and defines a central axis extending therebetween. The stick bar has a plurality of apertures formed through the body perpendicular to the central axis, each of the plurality of apertures defining a stick axis extending therethrough, wherein the stick axes are disposed substantially parallel to one another. The stick bar also has a plurality of plunger holes, each of the plurality of plunger holes being associated with a respective one of the plurality of apertures and extending from the surface of the body to the respective aperture at a right angle to the stick axis of the respective aperture. The stick bar further has a plurality of plungers, each of the plurality of plungers having an inner end and an outer end and being mounted in a respective one of the plurality of plunger holes so that the inner end of the plunger extends into the respective aperture, wherein the inner end of the plunger is movably biased towards the central axis of the bar.

In accordance with another aspect of the present invention, each of the plunger holes in the stick bar is internally threaded and each of the plungers is externally threaded and each of the plungers is threadingly mounted in the respective one of the plunger holes.

In accordance with another aspect of the present invention, the biasing force produced by each plunger in the stick bar can be adjusted by turning the threaded plunger relative to the threaded plunger hole.

In accordance with another aspect of the present invention, the outer end of each plunger of the stick bar is adapted to receive a tool for turning the threaded plunger.

In accordance with another aspect of the present invention, the stick bar further has a plurality of flats formed on the surface of the stick bar body, wherein each of the flats is disposed around a respective one of the plunger holes.

In accordance with another aspect of the present invention, the stick bar further comprises a plurality of jam nuts, wherein one jam nut is threaded over the outer end of each respective one of the plungers and tightened against the respective flat surface.

In accordance with another aspect of the present invention, each of the jam nuts includes a nylon insert for releasably securing the jam nut to the plunger.

In accordance with still another aspect, a stick bar for a cooking apparatus comprises an elongated body having first and second ends and defining a central axis extending therebetween. A plurality of apertures are formed through the body perpendicular to the central axis, each of the plurality of apertures defining a stick axis extending therethrough, wherein the stick axes are disposed substantially parallel to one another. A plurality of plunger holes are formed through the body, each of the plurality of plunger holes being associated with a respective one of the plurality of apertures and extending along a plunger hole axis from the surface of the body to the respective aperture, wherein each plunger hole axis is substantially perpendicular to the stick axis of the respective aperture. A plurality of spring loaded plungers are provided, each of the plurality of spring loaded plungers having an inner end and an outer end and being mounted in a respective one of the plurality of plunger holes so that the inner end of the plunger extends into the respective aperture. The inner end of each spring loaded plunger is axially biased along the respective plunger hole axis toward an opposing interior surface of the aperture within the stick bar.

In accordance with one embodiment, each of the plunger holes in the stick bar is internally threaded, each of the spring loaded plungers is externally threaded, and each of the spring loaded plungers is threadingly mounted in the respective one of the plunger holes.

In accordance with another embodiment the biasing force produced by each spring loaded plunger can be adjusted by turning the threaded plunger relative to the threaded plunger hole.

In accordance with still another embodiment, the stick bar further comprises a lug and a screw, wherein one end of the stick bar has a threaded hole formed therein, one of the stick bar and the lug has a first anti-rotation feature formed thereon, and the other of the stick bar and the lug has a complementary anti-rotation feature formed thereon. The first and second anti-rotation features are adapted to engage with one another to prevent relative rotation between the respective one and the other. After engaging the first and second anti-rotation features with one another, the lug is secured to the one end of the stick bar using the screw threaded into the threaded hole.

BRIEF DESCRIPTION OF THE DRAWINGS

A more complete understanding of the invention and its advantages will be apparent from the following Detailed Description when taken in conjunction with the accompanying Drawings, in which.

DETAILED DESCRIPTION

Referring now to the drawings, where like reference characters designate like or corresponding parts throughout the several views, there is illustrated an apparatus forming a first embodiment of the present invention which continuously prepares fried food articles 300, specifically corn dogs, on sticks 302. The apparatus includes a frame 10 which mounts five major components to process the food articles 300 to the final finished product. The components include a transport mechanism 12 to move the food articles 300 along the frame 10 using stick bars 38, a loading station 50 which inserts a first end 304 of sticks 302 into an aperture 40 in the stick bar 38 and a second end 306 into the food article 300 itself, a dipping station 162 which coats the food articles 300 with batter, a frying station 190 which cooks or deep fries the food articles 300 and an unloading station 220 which unloads the finished food articles 300 from the apparatus for packing and shipping to the customer. A typical stick 302 has a length of about 5 ½ inches, sides about ¼ inch wide and a thickness of 0.094 (3/32) inch. The stick can be made of wood or plastic, for example.

Figure 1:
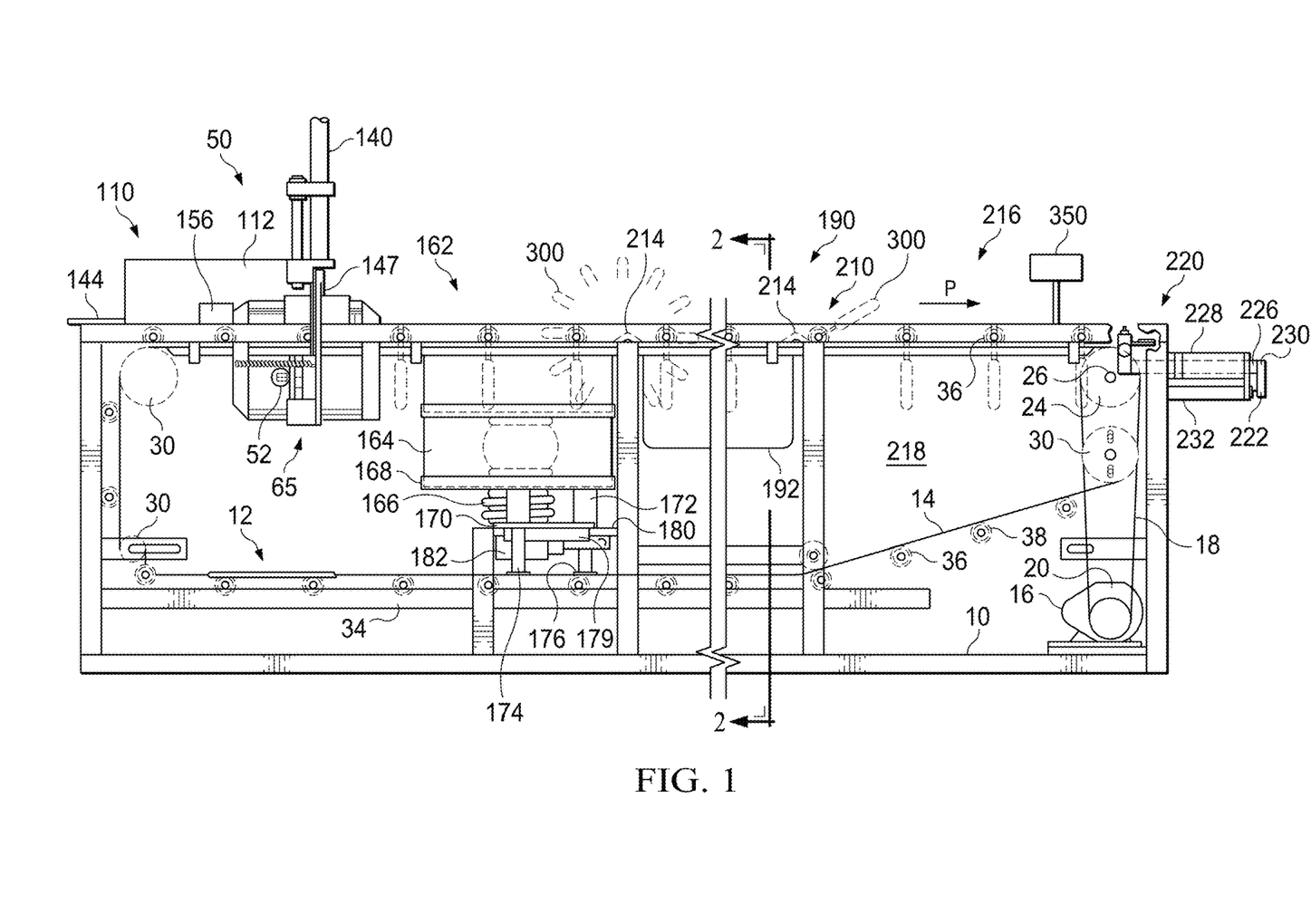
FIG. 1 is a side elevational view of an apparatus forming a first embodiment of the present invention.

The transport mechanism 12 includes a pair of parallel endless chains 14 extending on either side of and along the longitudinal axis of the frame 10 as best seen in FIG. 1. Chain motor 16 is located on the frame 10 at an end thereof proximate the unloading station 220. Motor chain 18 connects motor sprocket 20 connected to the drive shaft of the chain motor 16 and drive sprocket (not shown) attached to transport sprockets 24 by drive axle 26.

The drive axle 26 is journalled to drive axis bearings located on the frame 10. Idler sprockets 30 located at appropriate positions on the frame 10 provide for maintaining vertical and lateral position of the chains 14 on the frame 10. The chains 14 travel along the frame 10 and slidably contact upper chain tracks 32, thereby maintaining the chains 14 in the horizontal position proximate the top of the frame 10. The chains 14 rest on lower return tracks 34 proximate the bottom of the frame 10. The return tracks 34 support the chain above the floor. Each track has a wear strip thereon to reduce stretching and wear of the chains 14.

The direction of movement of the chains 14 on the upper chain tracks 32 is from the loading station 50 to the unloading station 220. This is the process direction indicated by arrow "P".

Rod connectors 36 are spaced at equal distances along each of the chains 14 with each connector 36 on one chain 14 being directly opposite another connector 36 on the parallel chain 14. Stick bars 38 are journalled to opposite pairs of the rod connectors 36. The transport chains 14 provide for moving the stick bars 38, which extend transversely of the longitudinal axis of the frame 10, in the process direction.

Figure 7:
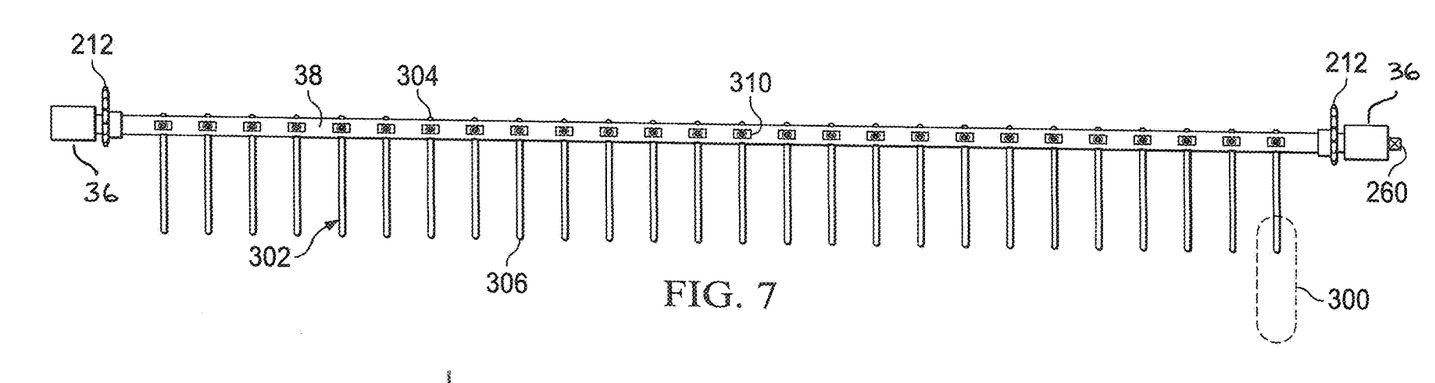
FIG. 7 is a view of the stick bar of the present invention, illustrating the spring loaded plunger holding a stick and a food article.
Figure 8:
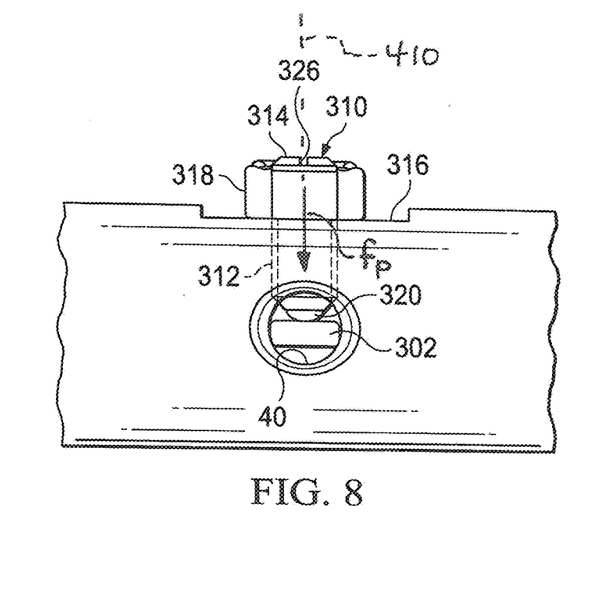
FIG. 8 is a detail view of the stick bar of FIG. 7.
Figure 9:
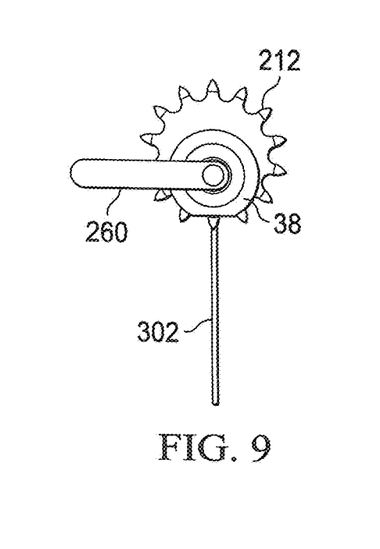
FIG. 9 is an end view of the stick bar of FIG. 7.

Spaced stick slots or apertures 40 extend through the stick bar 38. The apertures 40 each have a spring loaded plunger 310 extending therein, as shown in FIGS. 7 and 8. When the first end 304 of a stick 302 is inserted in an aperture 40, the ball 320 at the exposed tip of the spring loaded plunger 310 is slightly retracted into the spring loaded plunger 310 against the force of the internal coil spring 322 within the body 324 of the spring loaded plunger 310 and is urged against the side of the stick 302 to hold the first end of the stick 302 in the aperture 40 during the process of coating and frying the food article 300. The stick bar 38 can be made of a ⅞ inch diameter stainless steel rod, for example and the apertures 40 can have a diameter of 0.265 inches. While stick bar 38 is preferably cylindrical in cross section, the stick bar 38 can have a square or rectangular cross section or any other cross section desired.

Each stick bar 38 typically has a plurality of apertures 40 along its length, allowing each stick bar 38 to carry a plurality of food articles 300. For example, stick bars 38 having 16, 20 or 26 apertures 40 can be used. For purposes of illustration, FIG. 7 shows sticks 302 inserted into each aperture 40 of the stick bar 38; however, only one food article 300 is shown. During normal operation, each stick 302 would carry a respective food article 300. Each stick bar 38 has a threaded hole 312 extending from the exterior of the stick bar 38 into the aperture 40 to receive the spring loaded plunger 310, which has external threads 328 threaded into hole 312. The axis of the threaded hole 312 preferably is perpendicular the axis of the aperture 40. In some embodiments, the spring loaded plunger 310 can be adjusted in the hole 312 to provide a force of between about 3 ½ lbs. to 7 lbs. on the stick 302 to hold the stick 302 and food article 300 impaled thereon during the dipping and frying process. In other embodiments, the spring loaded plunger 310 can be adjusted in the hole 312 to provide a force of between about 4.3 lbs. to 6.3 lbs. on the stick 302. In further embodiments, the spring loaded plunger 310 can be adjusted in the hole 312 to provide a force of between about 4.0 lbs. to 7.0 lbs. on the stick 302. In still further embodiments, the spring loaded plunger 310 can be adjusted in the hole 312 to provide a force of between about 8.1 lbs. to 13.9 lbs. on the stick 302. The exterior end 314 of the spring loaded plunger 310 has a slot 326 allowing a screwdriver to be used to thread the spring loaded plunger 310 further into the aperture 40 or back it out of the aperture 40 slightly to adjust the force holding the stick 302 in the aperture 40. A flat 316 is machined around the hole 312 at the outer surface of the stick bar 38 to allow a lock nut 318 to be threaded on the outer threads 328 of the spring loaded plunger 310 and tightened against the flat 316 to lock the spring loaded plunger 310 in a position to properly hold the stick 300. Preferably the lock nut 318 has a Nylon locking feature, commonly known as Nyloc. A suitable spring loaded plunger for some embodiments is the model number GN 615-M6-KSN stainless steel ball spring plunger manufactured and sold by Elesa S.p.A. Via Pompei, 29 20900 Monza, Italy through Elesa USA Corporation, 1930 Case Parkway N. Twinsburg, Ohio 44087 which has a spring preload of 4.3 lbs. (19 N) which is the force necessary to begin to move the ball 320 into the body 324 against the force of spring 322 and a spring maximum load of 6.3 lbs. (28 N) which is the force necessary for maximum designed movement of the ball 320 into the body 324. This model has an M6 external thread 328, a length of 0.55 inches (14 mm) and a ball travel distance of 0.06 inches (1.5 mm). It is made of AISI 303 stainless steel with a screwdriver slotted head.

In another embodiment, the spring loaded plunger 310 can have a spring preload of 4.0 lbs. (18 N), which is the force necessary to begin to move the ball 320 into the body 324 against the force of spring 322, and a spring maximum load of 7.0 lbs. (31N), which is the force necessary for maximum designed movement of the ball 320 into the body 324. This model spring plunger 310 can have an M8 external thread 328 and length of 0.63 inches (16 mm). It can be made of AISI 303 stainless steel with a screwdriver slotted head. A suitable spring loaded plunger 310 for this embodiment is the model number GN 615-M8-KN stainless steel ball spring plunger, also manufactured and sold by Elesa S.p.A. through Elesa USA Corporation.

In yet another embodiment, the spring loaded plunger 310 can have a spring preload of 8.1 lbs. (36 N), which is the force necessary to begin to move the ball 320 into the body 324 against the force of spring 322, and a spring maximum load of 13.9 lbs. (62 N), which is the force necessary for maximum designed movement of the ball 320 into the body 324. This model spring plunger 310 can have an M8 external thread 328 and length of 0.63 inches (16 mm). It can be made of AISI 303 stainless steel with a screwdriver slotted head. A suitable spring loaded plunger 310 for this embodiment is the model number GN 615-M8-KSN stainless steel ball spring plunger, also manufactured and sold by Elesa S.p.A. through Elesa USA Corporation.

Figure 5:
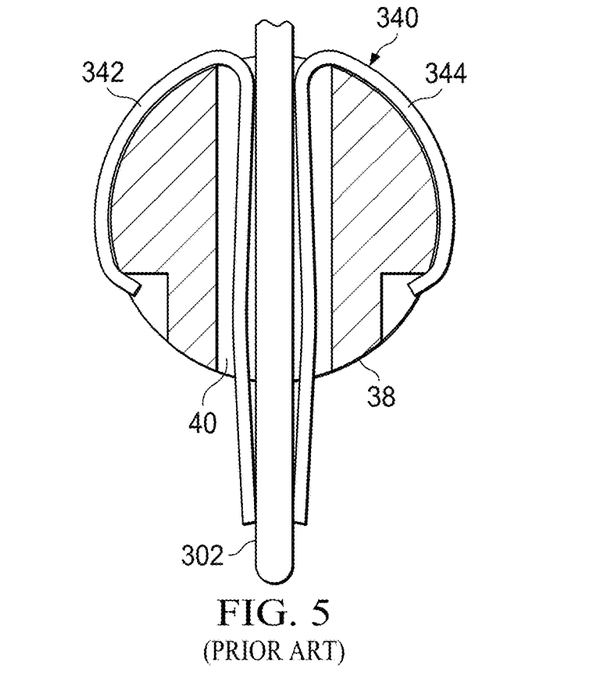
FIG. 5 is a detail view of a prior art spring to hold a stick in a stick bar.
Figure 6:
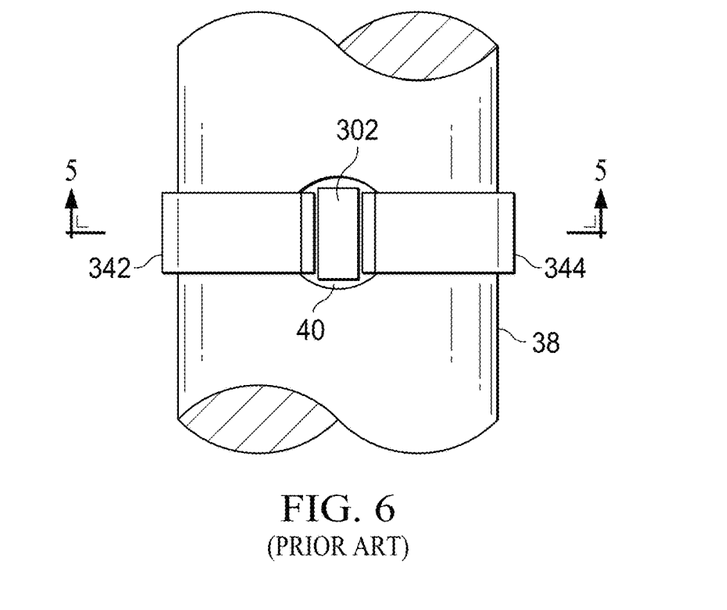
FIG. 6 is another view of the prior art spring of FIG. 5.

FIGS. 5 and 6 illustrate a known clamp 340 to hold sticks 302 in a stick bar 38. The clamp includes two sections 342 and 344 which pinch the stick 302 therebetween as seen in FIG. 5. While these clamps 340 are adequate, they are not readily adjustable, as is spring loaded plunger 310. Further, clamps 340 have critical heat treatment requirements to insure reliability. If the two sections 342 and 344 are not well matched, a non-uniform force can be applied to the sticks 302. As up to 4,000 spring loaded plungers 310 or clamps 340 are used in each apparatus, reliability and adjustability are critical.

The connectors 36 permit the stick bars 38 to freely rotate about their elongate axis. A gear 212 is mounted at each end of the stick bars 38 to rotate the stick bars 38 at the respective stations as will be discussed hereinafter. It will be noted that the axis of the gears 212 are offset from the axis of the stick bars 38. Further, at one end of the stick bar 38 is mounted a lug 260 to fix the stick bars 38 in a particular orientation at a particular station.

Figure 2:
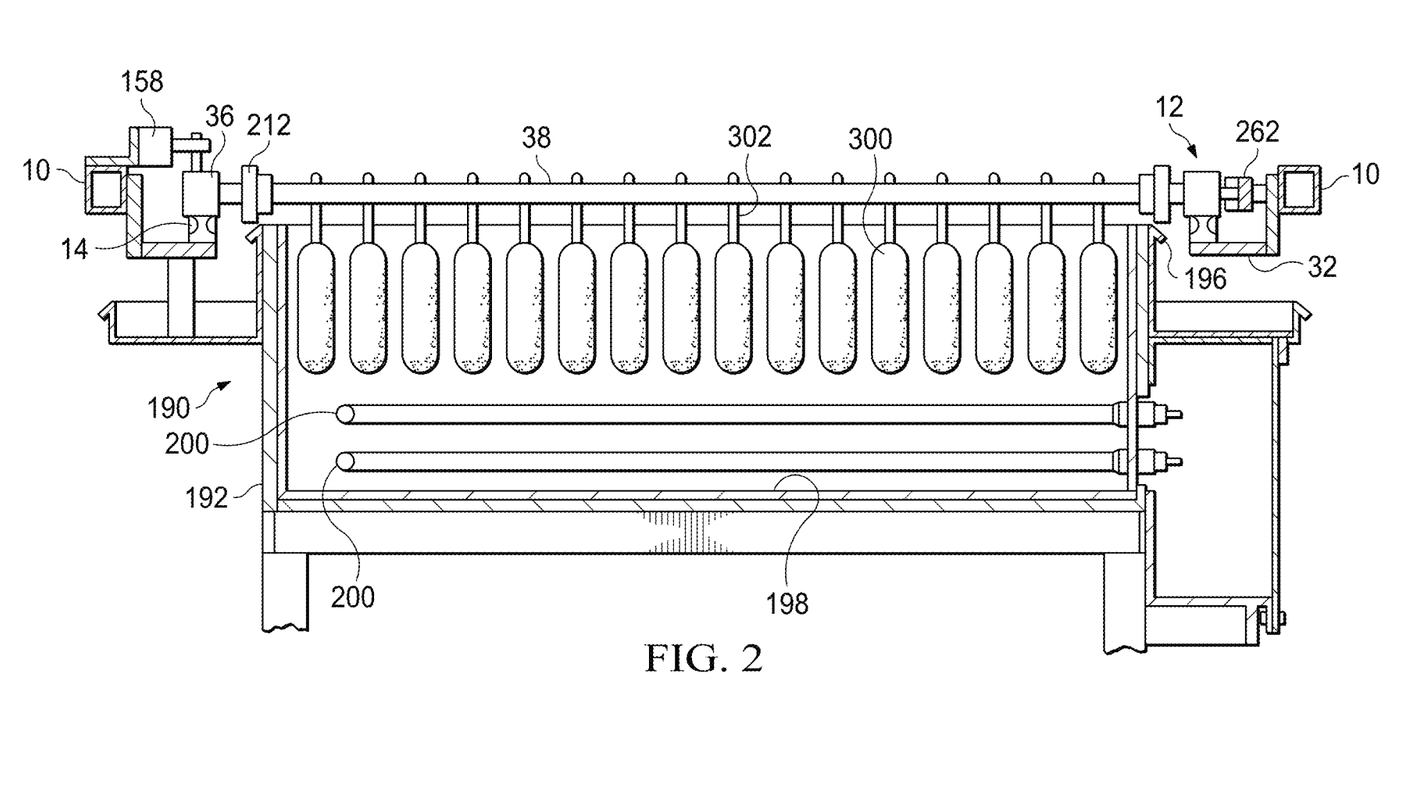
FIG. 2 is a sectional view of the frying station taken along line 2-2 of FIG. 1.

A control 350, typically containing a microprocessor or microcontroller, is provided input from the various stations of the apparatus, usually by microswitches, such as microswitch 156 in FIG. 1 and microswitch 158 in FIG. 2, to control the operation of the apparatus. Typically, the chains 14 will be advanced in a stepped manner. For example, the chains 14 will be moved to position one of the stick bars 38 in the loading station 50 and then stopped while the loading station 50 inserts the second end 306 of sticks 302 into the food articles 300 and the first end 304 thereof into apertures 40 of the stick bar 38.

As noted, the function of the loading station 50 is to insert individual sticks 302 into the food articles 300 and into the apertures in the stick bar 38 positioned in the loading station 50. This operation can be done manually, but is preferably automated by a device such as disclosed in U.S. Pat. No. 4,842,181 issued Jun. 27, 1989, to Glenn E. Walser, which patent is incorporated by reference in its entirety herein. The patent discloses a device for simultaneously inserting a number of parallel sticks 302 (identified by reference numeral 36 in U.S. Pat. No. 4,842,181) into parallel food articles 300 (identified by reference numeral 26 in U.S. Pat. No. 4,842,181) and into apertures 40 in a stick bar 38 (identified by reference numeral 56 in U.S. Pat. No. 4,842,181). U.S. Pat. No. 4,379,795 issued Apr. 12, 1983, to Glenn E. Walser is also incorporated by reference in its entirety herein.

FIG. 1 also illustrates a loading station 50 suitable for automatic operation. The loading station 50 has a food clamper 52, a stick inserter 110, clamper frame 65, a plunger cylinder 140, a magazine rod 144 and an alignment mechanism 147. Food articles 300 are manually inserted into the food clamper and the loading station 50 inserts the sticks 302 from a magazine 112 into the food articles 300 and the apertures 40 in the stick bar positioned in the loading station 50. The loading station has a channel 262 to engage the lug 260 of the stick bar 38 positioned in the loading station 50 to orient the apertures 40 vertically for insertion of the sticks 302 from above, through the stick bar 38 and skewering food articles 300, such that the sticks 302 and food articles 300 hang vertically downward from the stick bar 38 as shown in FIG. 1.

The control 350 then causes the chains 14 to advance to position the just loaded stick bar 38 over the dipping station 162. The dipping station 162 has a coating bin 164 vertically lifted by a bin elevator 166, which interconnects bin frame 168 and elevator frame 170. The elevator frame 170 has vertically oriented elevator bushings 172 connected thereto. Elevator rods 174 vertically oriented and rigidly connected to the bin frame 168 are telescoped through the elevator bushings 172. The elevator rods have stops 176 on the ends thereof which limit the upward travel of the rods 174 within the elevator bushings 172. The bin elevator is an air stroke actuator (which is basically an inflatable rubber bellows) which, when inflated, elevates the bin 164 upward and when deflated allows the bin 164 to be lowered. Each up and down movement of the coating bin 164 is a dip stroke.

It is desirable to maintain the batter or coating substance within the coating bin 164 at a cool temperature to insure that the batter sticks to the food article 300 (the hot dog or wiener) and rapidly expands on contact with the hot grease in the frying station 190. Therefore, the coating bin 164 has a water jacket in the walls thereof through which water is circulated during operation of the coating bin 164. A suitable feed opening in the wall of the coating bin 164 allows for feeding additional batter into the coating bin 164.

The control 350 will position the loaded stick bar 38 over the coating bin 164 in the lowered position. The control 350 will then elevate the coating bin, for example 6 inches, to submerge the entire food article 300 in the batter. The level of the batter within the bin 164 can be adjusted by varying the input rate of batter through the feed opening to insure the food article 300 is completely coated. Channel 262 at the dipping station 162 also engages the lug 260 on the stick bar 38 to hold the food articles 300 vertical in the coating bin 164.

It is usually desirable to dip the food article 300 twice, so after a first dip is completed, the control 350 lowers the coating bin 164 and moves the chains and stick bars 38 forward so that the next stick bar 38 in sequence is also positioned above the coating bin 164 as well. The control 350 then again raises the coating bin 164 to submerge the food articles 300 so that the food articles 300 on each stick bar 38 experiences two dippings.

It is beneficial to "jerk" the coating bin 164 in the process direction during the immersion of the food articles 300 in the batter if the chains 14 are moved in the process direction during dipping. The food articles 300 would leave a wake in the batter which builds up batter in front of the food article 300 in the process direction. By jerking the batter bin in the direction of movement of the stick bars 38, the movement of batter is greater than the movement of the food articles 300 and batter coating substance builds up on the rear of the food article 300 opposite the process direction.

The elevator frame 170 has horizontally oriented jerk bushings 179 connected thereto. Jerk rods 180 are rigidly attached to the frame 10 and telescoped through the jerk bushings 179. Jerk cylinder 182 interconnects the elevator frame 170 and the frame 10 such that when the jerk cylinder 182 is extended, the elevator frame 170, and therefore the coating bin 164 are jerked along the frame axis.

When the jerk cylinder 182 is extended, the coating bin 164 is jerked in the direction of movement (process direction) of the stick bars 38. When retracted, the coating bin 164 is jerked in the opposite direction.

After the second dip, the stick bar 38 is then moved toward the frying station 190. As it approaches the frying station 190, the gears 212 on each side of the stick bar 38 engage gear racks 214 on frame 10. Gears 212 and gear racks 214 form an elevation mechanism 210. As the stick bar 38 moves in the process direction, the gear racks 214 and gears 212 cause the stick bar 38 to rotate 360 degrees about its elongate direction as seen in FIG. 1 to lift the food articles 300 and sticks 302 over the front lip 196 of the fry tank 192 and into the hot grease therein. After being rotated into the fry tank 192, a channel 262 at the frying station engages lug 260 to hold the food articles vertical, as the frying process might otherwise move the food articles 300 about and create non-uniform frying.

By mounting the gears 212 eccentrically on the stick bar 38, the food article is flipped out of the lower position quickly, rotated more slowly at the top of the rotation, and flipped quickly back to the lower position.

The level of grease within the fry tank 192 is such that the food article 300 depending from the stick bar 38 will be completely immersed therein. The tank floor 198 must thus be at least deeper than the length of the food article 300. It is preferable to place electrical heating elements 200 within the hot grease and suspended above the floor 198 about 1 inch to heat the grease. This design requires less power and does not burn tailings and other debris on the bottom of the tank floor, as do tanks heated from the bottom.

After the frying has been completed, the control 350 moves the chains and stick bar 38 out of the frying station 190. Again the gears 212 on each side of the stick bar 38 engage second gear racks 214 on frame 10 at the rear of the frying station 190. As the stick bar 38 moves in the process direction, the gear racks 214 and gears 212 cause the stick bar 38 to rotate another 360 degrees about its elongate direction to lift the food articles 300 and sticks 302 over the back lip of the fry tank 192.

If desired, the length of the frame 10 can be sufficient to provide a cooling station 216 between the frying station 190 and the unloading station 220. As the food articles 300 are moved through the cooling station 216, they cool and drain. The cooling station 216 has open space 218 to allow the food articles 300 exposure to air. If desired, cooling fans and the like can be placed in this station as well.

Figures 3, 10:
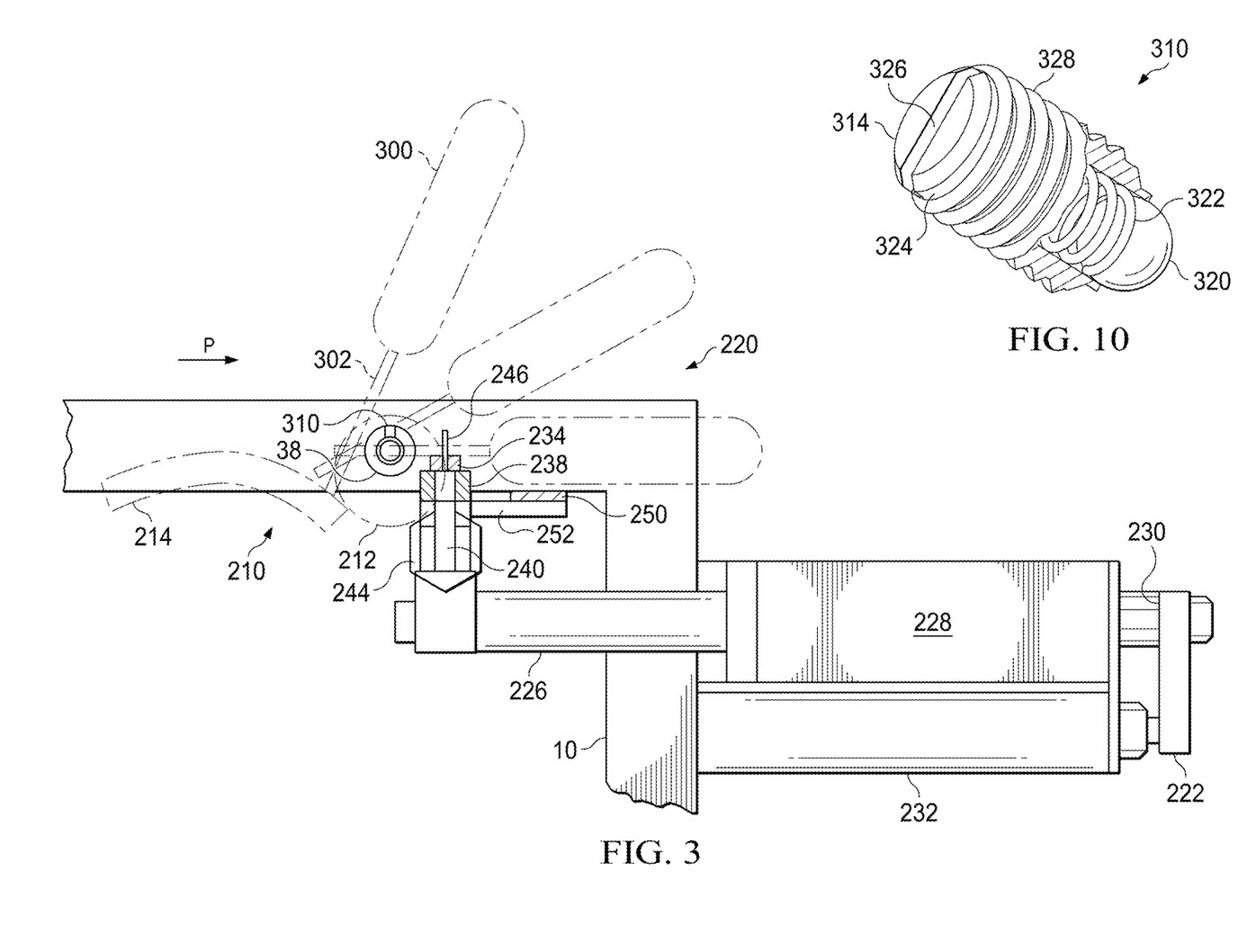
FIG. 3 is a sectional view of the unloading station.
FIG. 10 is a partial cut away view of a spring loaded plunger.
Figure 4:
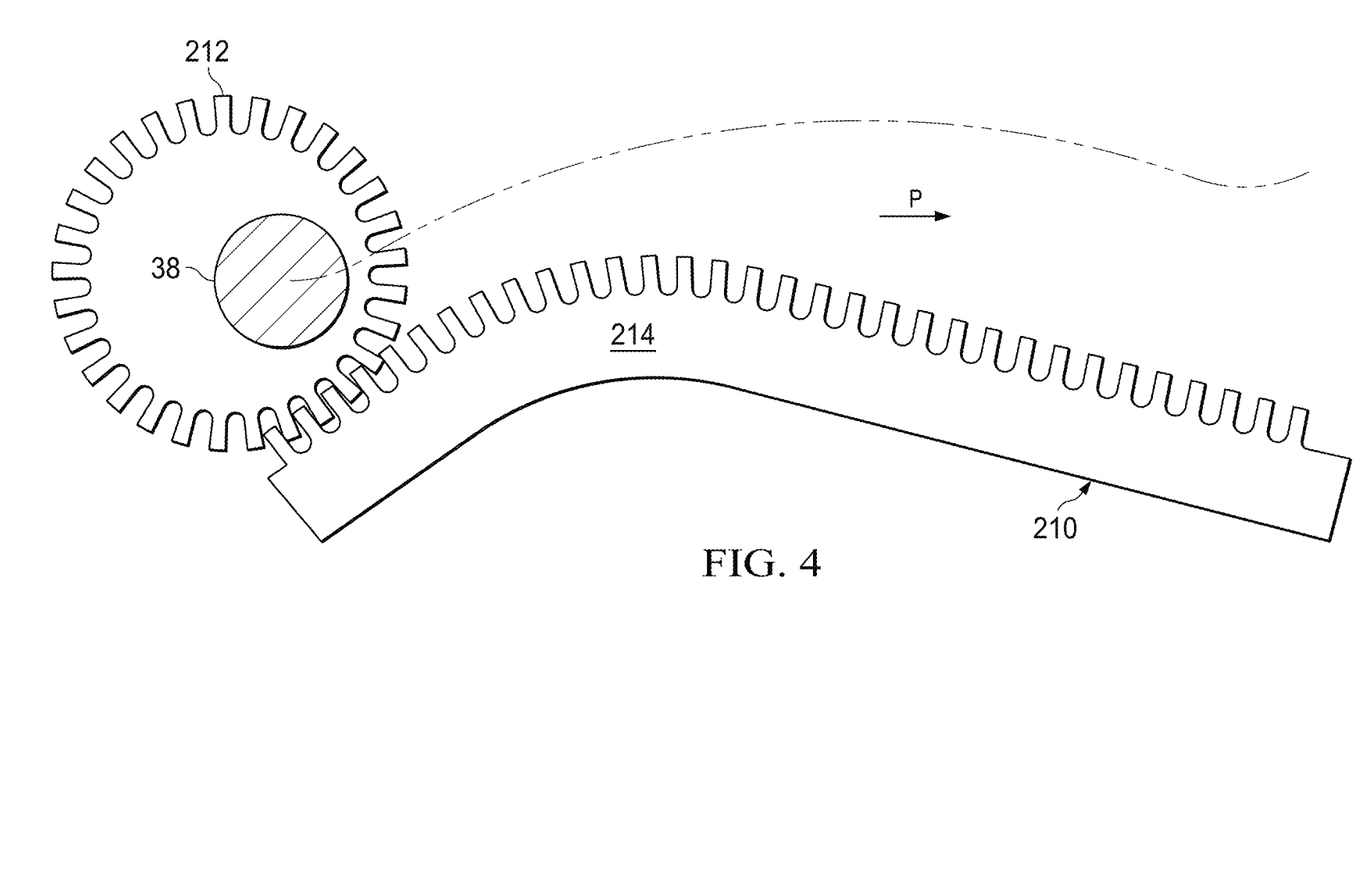
FIG. 4 is a detail view of a gear rack for rotating the stick bar along the apparatus.

After the cooling has been completed, the control 350 moves the chains and stick bar 38 into the unloading station 220 as seen in FIG. 3. Again the gears 212 on each side of the stick bar 38 engage third gear racks 214 positioned on frame 10 at the unloading station 220. As the stick bar 38 moves in the process direction, the gear racks 214 and gears 212 cause the stick bar 38 to rotate 270 degrees about its elongate direction to position the food articles 300 facing the end of the frame for removal.

The unloading station 220 includes stripper frame 222 slidably attached to the end of frame 10 for reciprocal movement in the process direction. Stripper rods 226 extend axially of the frame 10 and are rigidly attached to the stripper frame 222. Stripper bushings 228 are rigidly connected to the frame 10. The rods 226 are telescoped in the stripper bushings 228. The stripper rods 226 have stops 230 on the ends thereof for limiting the travel of the stripper rods 226 within the stripper bushing 228.

Stripper cylinders 232 interconnect the frame 10 with the stripper frame 222. When retracted, the cylinders 232 move the stripper frame 222 and rods 226 within the bushings 228 toward the end of the frame 10 and toward the stick bar 38 in the position convenient for unclamping. When retracted, the stripper cylinders 232 extend the stripper frame 222 toward the stick bar 38.

Stripper slide 234 is slidably telescoped on the support bar 238. Support bar 238 is rigidly attached to the forward end of the stripper rods 226 and, thus, in effect to the stripper frame 222. Thus, it might be said that the support bar 238 with the stripper bars 226 and the stripper frame 222 together form this frame. Cylinder arm 240 is rigidly connected to the bottom of the stripper slide 234 and extends through an arm slot in the support bar 238. Slide cylinder 244 interconnects the cylinder arm 240 and the support bar 238.

When the slide cylinder 244 is extended, stick gripper rods 246 vertically extending from the stripper slide 234 are brought proximate fixed stick gripper rods(not shown) extending from the support bar 238. The fixed stick gripper rods extend from the support bar 238 through rod slots (not shown) in the stripper slide 234. The gripper rods 246 and fixed gripper rods are aligned. The fixed gripper rods remain stationary and the stick gripper rods 246 reciprocate back and forth. The rod slots are of sufficient dimensions that the stripper slide 234 may reciprocate freely. When the slide cylinder 244 is in the extended position, the stick gripper rods 246 move against sticks 302 within the stick bar 38 and clasp the sticks 302 between the stick gripper rods 246 and fixed gripper rods. When the slide cylinder 244 is in the extended position and the stripper cylinders 232 are retracted, the sticks 302 are withdrawn radially from the spring loaded plungers 310 within the apertures 40. A stop is welded to the underside of the support bar 238 against which the cylinder arm 240 abuts when the rods 246 and fixed gripper rods are slightly less apart than the width of the stick 302. When the slide cylinder 244 is retracted, the stick gripper rods 246 will release the sticks 302 after the stripper cylinders 232 have been retracted. A receiving tray or conveyor (not shown) is conveniently attached to the end of the frame 10 for receiving the food articles 300 released by the stick grippers 246. It will be understood that this tray can be adapted for automatic packaging systems or for manual unloading as desired.

Slap bar 250 is attached to the support bar 238 by a plurality of fingers 252. When the food articles 300 are laid in a horizontal position as seen in FIG. 3, by the rotation of the stick bar 38, the food article 300 contacts the slap bar 250. This prevents the stick 302 from breaking as the stick 302 hits the top of the stripper slide 234. The momentum of the food articles 300 as they are rotated 270 degrees into the unloading station 220 might otherwise cause difficulty.

While the operation of the apparatus has been described by following one stick bar 38 in the process direction to completion of the process on the food articles 300 suspended thereon, each of the other stick bars 38 mounted on chains 14 perform the same functions so that a continuous production of fried food articles 300 occurs as the apparatus is operated. In one device constructed in accordance with the teachings of the present invention, 58 stick bars 38 are used, in another device, 66 stick bars 38 are used, and in yet another device 76 stick bars 38 are used. Production of 3,000 to 16,000 food articles 300 per hour is possible with this apparatus. As the apparatus is used to prepare human consumed food articles, virtually all elements of the apparatus, such as stick bars 38 and spring loaded plungers 310, are made of stainless steel or other food safe material.

Referring now to FIGS. 11-17, there is illustrated a stick bar 38 in accordance with another aspect. Unless otherwise described, the stick bar 38 is substantially similar to the stick bars previously described, and like reference numbers are used to designate like elements.

Figure 11:
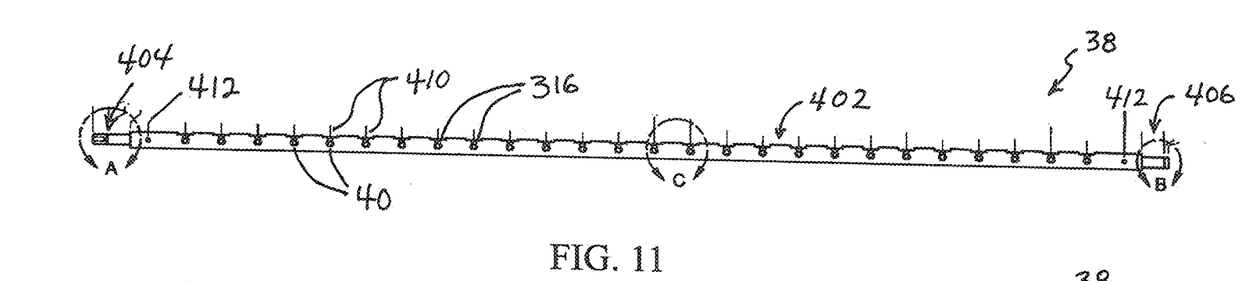
FIG. 11 is a top view of a stick bar in accordance with another aspect.
Figure 12:
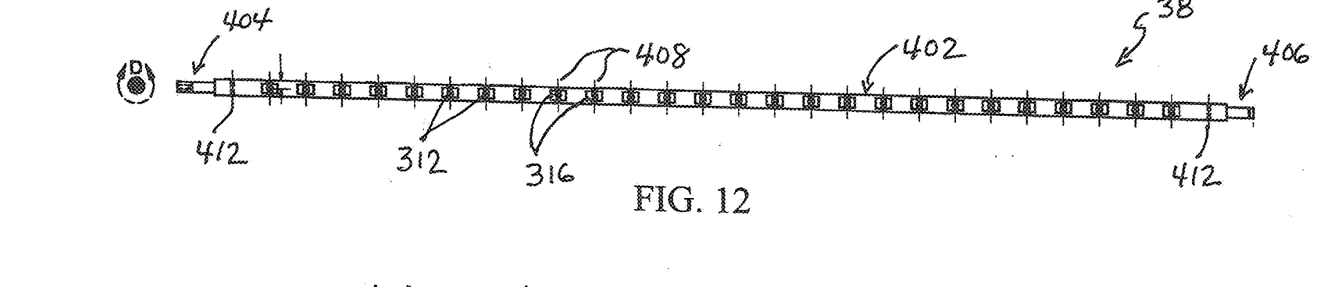
FIG. 12 is a side view of the stick bar of FIG. 11.

Referring first to FIGS. 11 and 12, there is illustrated the stick bar 38 in accordance with another aspect. For purposes of illustration, the stick bar 38 is shown in FIGS. 11 and 12 prior to insertion of the sticks 302 (FIG. 7) and prior to installation of the gear 212, rod connectors 36, lug 260, spring loaded plungers 310, lock nuts 318 and other components used during operation. The stick bar 38 includes a central portion 402 disposed between first and second end portions 404 and 406, respectively. A plurality of apertures 40 are formed through the central portion 402 of the stick bar 38 for receiving the sticks 302 for the food items. Adjacent to each aperture 40 is a corresponding flat surface (also called "flat") 316 formed on the side of the stick bar 38. In most embodiments, each flat 316 is formed substantially parallel to the stick insertion axis (also called "aperture axis") 408 of the adjacent aperture 40. A plunger hole 312 is formed through each respective flat 316 and into the stick bar 38 to intersect the adjacent aperture 40. In most embodiments, each plunger hole 312 has a hole axis 410 that is substantially perpendicular to the associated flat 316 and substantially perpendicular to the adjacent aperture axis 408. Roll pin holes 412 can be formed through the stick bar 38 adjacent the first end 404 and the second end 406 for receiving roll pins (not illustrated) for securing the gears 212 in a fixed position on the stick bar.

Figure 13:
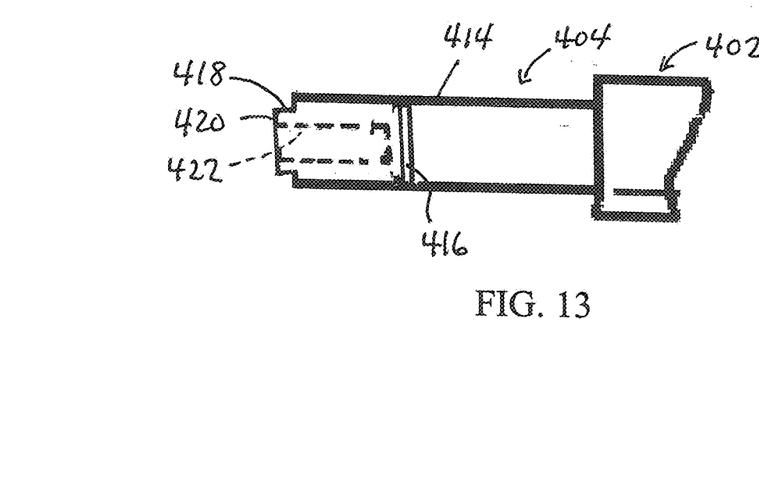
FIG. 13 is an enlarged partial top view of one end of the stick bar of FIG. 11 designated "A" in FIG. 11.

Referring now also to FIG. 13, there is illustrated additional detail of the first end portion 404 of the stick bar 38. The first end portion 404 can have a reduced diameter portion 414 (i.e., reduced compared to the diameter of the central portion 402) for mounting a rod connector 36 (FIG. 7) to the stick bar 38. The rod connector 36 can include a journal surface or other bearing to allow the stick bar 38 to rotate independently of the rod connector. The first end portion 404 can include a snap ring groove 416 formed on the reduced diameter portion 414 to capture the rod connector 36 on the end of the stick bar 38. The first end portion 404 can further include features for securely mounting the lug 260 to the stick bar to prevent rotation of the lug relative to the stick bar. In the illustrated embodiment, the first end portion 404 includes a shoulder 418 formed across the outer end 420 of the stick bar 38 that is shaped to interfit with a groove 436 (FIG. 17) formed on the inner surface of the lug 260. The first end portion 404 can further include a threaded hole 422 formed into the outer end 420 for receiving a screw 424 (FIG. 17) to secure the lug 260 to the stick bar 38. Although the stick bar 38 of the illustrated embodiment includes a first end portion 404 having reduced diameter, other embodiments can have a first end portion of similar diameter to the central portion 402. Although the stick bar 38 of the illustrated embodiment includes a shoulder 418 formed on the first end portion 404 to prevent rotation of the lug 260 relative to the stick bar, other embodiments can include alternative features to prevent rotation between the mating parts, including, but not limited to cooperating keys and keyways, roll pins and roll pin holes, splines, etc.

Figure 14:
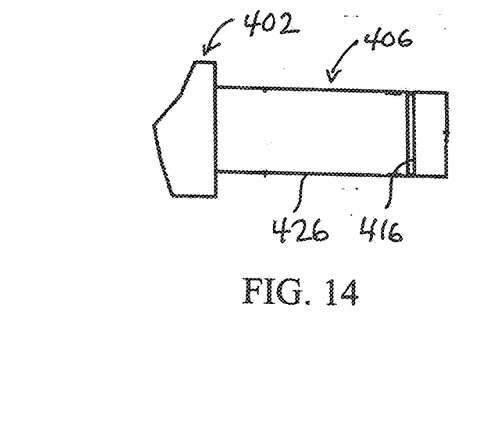
FIG. 14 is an enlarged partial top view of another end of the stick bar of FIG. 11 designated "B" in FIG. 11.

Referring now to FIG. 14, there is illustrated additional detail of the second end portion 406 of the stick bar 38. The second end portion 406 can have a reduced diameter portion 426 (i.e., reduced compared to the diameter of the central portion 402) for mounting a rod connector 36 to the stick bar 38. The rod connector 36 can include a journal surface or other bearing to allow the stick bar 38 to rotate independent of the rod connector. The second end portion 406 can include a snap ring groove 416 formed on the reduced diameter portion 426 to capture the rod connector 36 on the end of the stick bar 38. Although the stick bar 38 of the illustrated embodiment includes a second end portion 406 having reduced diameter, other embodiments can have a second end portion of similar diameter to the central portion 402.

Figure 15:
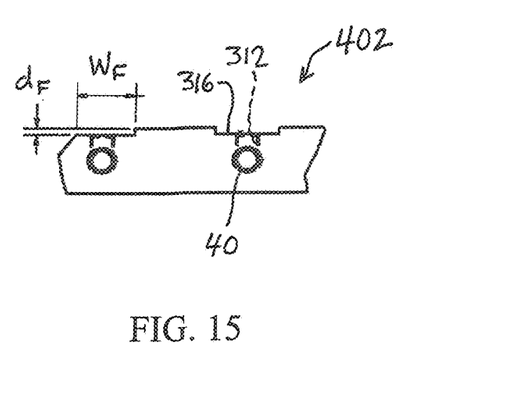
FIG. 15 is an enlarged partial top view of a central portion of the stick bar of FIG. 11 designated "C" in FIG. 11.

Referring now to FIG. 15, there is illustrated additional detail of the central portion 402 of the stick bar 38. The central portion 402 can have a generally circular cross section except for the flats 316 formed adjacent to each aperture 40. The plunger holes 312 (shown in hidden line) extend through the flats 316 to intersect the apertures 40. Each plunger hole 312 can be internally threaded to accept one spring loaded plunger 310. In the embodiment shown, the plunger holes 312 can be threaded with M8 threads to accept spring loaded plungers 310 having M8 external threads 328. In other embodiments, the plunger holes 312 can be internally threaded with M6 threads to accept spring loaded plungers 310 having M6 external threads 328. In still other embodiments, the plunger holes 312 can be threaded with threads sized to accept the external threads 328 of the selected spring loaded plungers 310. The width (denoted "$w_F$") and depth (denoted "$d_F$") of the flats 316 can be selected to accommodate lock nuts 318 of size compatible with the external threads 328 of the spring loaded plungers 310.

Referring still to FIG. 15, and also again to FIGS. 8 and 10, the spring 322 (FIG. 10) of the spring loaded plunger 310 biases against the ball 320 with an axial force (denoted "$f_P$" in FIG. 8) directed along the central axis of the plunger. The threads 328 of the spring loaded plunger 310 are also disposed around the central axis of the plunger. Thus, as best seen in FIG. 8, when the spring loaded plungers 310 are threaded into the plunger holes 312 on the stick bar 38, the spring loaded plungers can exert the axial force $f_P$ directed along the plunger hole axis 410 against sticks 302 inserted into the apertures 40. This axial force $f_P$ directed along the plunger hole axis 410 presses the stick 302 against the opposing interior surface of the aperture 40 within the stick bar itself to provide frictional force to removably secure the stick with a predetermined resistance to removal. The known clamp 340 illustrated in FIGS. 5 and 6 does not secure the stick 302 with an axial force directed against the stick within the stick bar 38 itself, but rather secures the stick with forces external to the stick bar aperture 40. Further, by rotating the spring loaded plunger 310 along the threads of the plunger hole 312, the unloaded position of the ball 320 can be adjusted axially along the plunger hole axis 410 to change the axial force $f_P$ exerted by the plunger on the stick 302 when the stick is inserted into the aperture 40. The known clamp 340 illustrated in FIGS. 5 and 6 does not allow an axial force exerted against the sticks 302 within the apertures 40 of the stick bar 38 to be adjusted by turning a threaded element.

Figure 16:
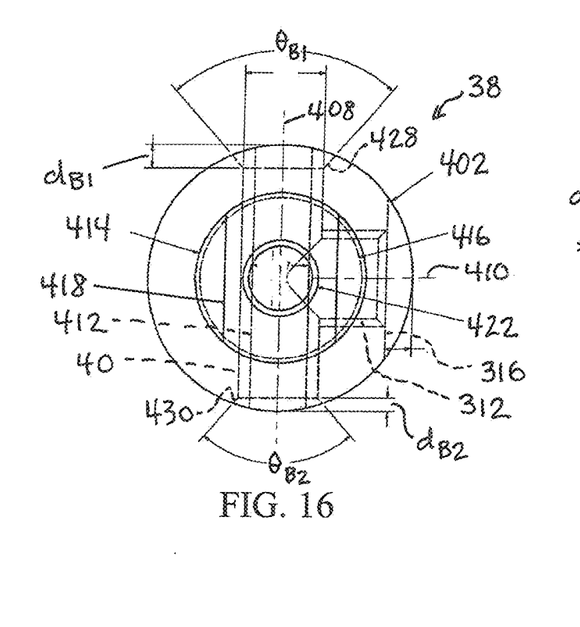
FIG. 16 is an enlarged end view of the stick bar of FIGS. 11 and 12 designated "D" in FIG. 12.

Referring now to FIG. 16, an end view of the stick bar 38 is provided to further describe the features thereof. The cylindrical cross sections of the central portion 402 and relatively reduced diameter portion 414 of the first end portion 404 are shown, as well as the slightly smaller snap ring groove 416 (shown in hidden line) formed on the first end portion. In the embodiment shown, the central portion 402 has a diameter of about 0.875 inches and the reduced diameter portion 414 has a diameter of about 0.560 inches. Other embodiments can have different dimensions. The aperture 40 (shown in hidden line) is a through-hole formed through the stick bar 38 along the aperture axis 408. In the embodiment shown, the aperture 40 has a diameter of about 0.265 inches. Other embodiments can have different dimensions The radially outward ends of the aperture 40 can include a first bevel portion 428 on the stick entrance side and/or a second bevel portion 430 on the stick exit side to facilitate insertion of the sticks and/or to reduce scraping the sticks on the edges of the aperture. The first bevel portion 428 can define a first bevel angle (denoted "$\theta_{B1}$") and a first bevel depth (denoted "$d_{B1}$") and the second bevel portion 430 can define a second bevel angle (denoted "$\theta_{B2}$") and a second bevel depth (denoted "$d_{B2}$"). In the embodiment shown, the first and second bevel angles, $\theta_{B1}$ and $\theta_{B1}$, are both approximate 82 degrees (measured in an arc across the aperture 40). In other embodiments, the first and second bevel angles, $\theta_{B1}$ and $\theta_{B1}$, can have either the same value or different values from one another, and each can be in the range from 78 degrees to 87 degrees. Other embodiments can have still different dimensions. In the embodiment shown, the first bevel depth $d_{B1}$ has a value approximate 1.8 times the second bevel depth $d_{B2}$. In some embodiments, the first bevel depth $d_{B1}$ has a value approximately 0.078 inches and the second bevel depth $d_{B2}$ has a value of approximately 0.043 inches. Other embodiments can have still different dimensions. In other embodiments, the first and second bevel depths can be the same or different from one another.

Referring still to FIG. 16, the plunger hole 312 extends along the plunger hole axis 410 from the flat 316 to the aperture 40. As best seen in FIG. 8, this allows the ball 320 at the tip of the spring loaded plunger 310 (shown in phantom) to a contact stick 302 extending through the aperture 40. Also visible in FIG. 16 are the roll pin holes 412 used to secure the gears 212 to the stick bar 38. In the illustrated embodiment, the roll pin holes 412 are aligned with (although axially offset from) the aperture axes 408; however, this alignment is not required. In other embodiment, one or both roll pin holes 412 may be inclined with respect to the aperture axes 408. Also visible in FIG. 16 are the shoulder 418 formed across the outer end 420 of the stick bar 38 to interfit with the groove 436 formed on the inner surface of the lug 260 and the threaded hole 422 in the end of the stick bar 38 used to secure the lug 260.

Figure 17:
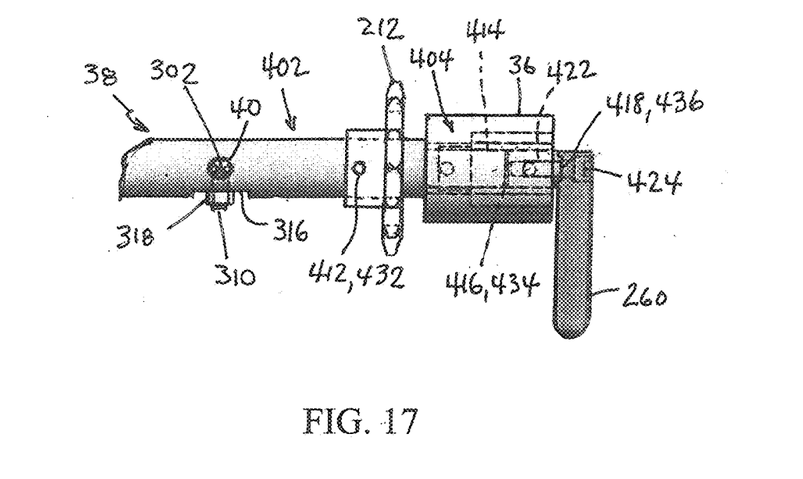
FIG. 17 is another partial top view the stick bar of FIG. 11 showing one end with additional components connected thereto for operation.

FIG. 17 is another partial top view the stick bar 38 of FIGS. 11-16 showing one end of with a stick 302 inserted in the aperture 40 and with additional components connected to the stick bar for operation. The spring loaded plunger 310 is threaded into the plunger hole 312 (not visible) formed in the central portion 402 of the stick bar 38 and secured with the lock nut 318 bearing against the flat 316 until the ball 320 (FIG. 8) extends into the aperture 40. A stick 302 inserted in the aperture 40 is biased along hole axis 410 by the force $f_P$ from the ball 320 against the back side of the aperture to become removably secured with a predetermined resistance to movement. The gear 212 is secured to the stick bar 38 by a roll pin 432 inserted through coincident roll pin holes 412 formed in the stick bar and gear collar. The connector 36 is disposed on the reduced diameter portion 414 of the first end portion 404 and rotatingly secured by a snap ring 434 snapped into the snap ring groove 416. The lug 260 is positioned on the outer end 420 of the stick bar 38 so that the groove 436 of the lug fits over the shoulder 418 of the stick bar and the two elements are secured together by the screw 424 that extends through the lug into the threaded hole 422.

While multiple embodiments of the present invention have been illustrated in the accompanying Drawings and described in the foregoing Detailed Description, it will be understood that the invention is not limited to the embodiment disclosed, but is capable of numerous rearrangements, modifications and substitutions of parts and elements without departing from the scope and spirit of the invention.

What is claimed is:

1. A stick bar for a cooking apparatus, the stick bar comprising:
   an elongated stainless steel body having a first end and a second end and defining a central axis extending therebetween;
   a plurality of apertures formed through the body perpendicular to the central axis, each of the plurality of apertures defining a stick axis extending therethrough, wherein the stick axes are disposed parallel to one another;
   a plurality of plunger holes, each of the plurality of plunger holes being associated with a respective one of the plurality of apertures and extending from a surface of the body to the respective aperture at a right angle to the stick axis of the respective aperture;
   a plurality of plungers, each of the plurality of plungers having an inner end and an outer end and being mounted in a respective one of the plurality of plunger holes so that the inner end of the plunger extends into the respective aperture, wherein the inner end of the plunger is movably biased towards a central axis of the stick bar; and
   wherein:
   each of the plunger holes in the stick bar is internally threaded;
   each of the plungers is externally threaded; and
   each of the plungers is threadingly mounted in the respective one of the plunger holes.

2. The stick bar of claim 1, wherein the biasing force produced by each plunger is adjusted by turning the threaded plunger relative to the threaded plunger hole.

3. The stick bar of claim 2, wherein the outer end of each plunger is adapted to receive a tool for turning the threaded plunger.

4. The stick bar of claim 1, further comprising a plurality of flats formed on the surface of the stick bar body, wherein each of the flats is disposed around a respective one of the plunger holes.

5. The stick bar of claim 4, further comprising a plurality of jam nuts, wherein one jam nut is threaded over the outer end of each respective one of the plungers and tightened against the respective flat surface.

6. The stick bar of claim 5, wherein each of the jam nuts includes a nylon insert for releasably securing the jam nut to the plunger.

7. A stick bar for a cooking apparatus, the stick bar comprising:
   an elongated body having a first end and a second end and defining a central axis extending therebetween;
   a plurality of apertures formed through the body perpendicular to the central axis, each of the plurality of apertures defining a stick axis extending therethrough, wherein the stick axes are disposed substantially parallel to one another;
   a plurality of plunger holes, each of the plurality of plunger holes being associated with a respective one of the plurality of apertures and extending along a plunger hole axis from the surface of the body to the respective aperture, wherein each plunger hole axis is perpendicular to the stick axis of the respective aperture;
   a plurality of spring loaded plungers, each of the plurality of spring loaded plungers having an inner end and an outer end and being mounted in a respective one of the plurality of plunger holes so that the inner end of the plunger extends into the respective aperture, wherein the inner end of each spring loaded plunger is axially biased along the respective plunger hole axis toward an opposing interior surface of the aperture within the stick bar; and
   wherein:
   each of the plunger holes in the stick bar is internally threaded;
   each of the spring loaded plungers is externally threaded; and
   each of the spring loaded plungers is threadingly mounted in the respective one of the plunger holes.

8. The stick bar of claim 7, wherein the biasing force produced by each spring loaded plunger is adjusted by turning the threaded plunger relative to the threaded plunger hole.

9. The stick bar of claim 7, further comprising a lug and a screw, wherein:
   one end of the stick bar has a threaded hole formed therein;
   one of the stick bar and the lug has a first anti-rotation feature formed thereon;
   the other of the stick bar and the lug has a complementary anti-rotation feature formed thereon, wherein the first and second anti-rotation features are adapted to engage with one another to prevent relative rotation between the respective one and the other; and
   wherein, after engaging the first and second anti-rotation features with one another, the lug is secured to the one end of the stick bar using the screw threaded into the threaded hole.

* * * * *